Patented Sept. 1, 1936

2,052,716

UNITED STATES PATENT OFFICE 2,052,716

COMPOUNDS OF BASIC DYESTUFFS WITH SULPHURIC ACID ESTER SALTS

Samuel Lenher, Wilmington, Del., assignor to E. I. du Pont de Nemours & Company, Wilmington, Del., a corporation of Delaware No Drawing. Application July 13, 1933, Serial No. 680,259

5 Claims. (Cl. 260—11)

This invention relates to new colors and processes for preparing the same. The invention particularly relates to the formation of dyestuff compositions from basic colors.

One object of the invention comprises the formation of dyestuff compositions by reacting dyestuffs with salts of higher alkyl sulphuric acid esters. A further object of the invention pertains to the preparation of dyestuff compositions by reacting, in solution, a basic dye and a salt of a sulphuric ester of a normal primary straight-chain aliphatic alcohol having from 8 to 18 carbon atoms. A further object of the invention relates to a method of dyeing fabric whereby the novel dyestuff compositions are deposited on the fabric during the dyeing operation. Further objects of the invention will appear hereinafter.

One mode of preparing the novel dyestuff compositions of the character to which the invention relates comprises dissolving the dyestuff in water (where basic dyestuffs are used the dyestuff will be dissolved in water as the hydrochloride or as the salt of the dyestuff prepared from acid other than hydrochloric), the dyestuffs being present in aqueous solution in the desired concentration, then adding a water-soluble salt of the fatty alcohol sulphate to the aqueous solution, preferably adding an excess of alcohol sulphate salt in order to redissolve any dyestuff composition which is precipitated, then boiling the solution, and where it is desired to dye a fabric, passing the fabric thru the boiling solution, the dyestuff composition being deposited on the fabric.

The following examples illustrate methods for operating the invention, and are to be construed as illustrative only:

Example 1

Dyeings were made with 100 lbs. of silk in 500 gallons of liquor using 0.1 lb. of Rhodamine B Extra ("Colour Index" #749) and 1.0 lb. of a mixture of cetyl and octadecyl sodium sulphates with Glauber's salt. The dyeings were started at 120° F., the temperature was raised to 180–190° F., and the dyeings were run for 45 minutes; the silk was then rinsed and dried. The dyeings were then treated in fresh baths with 2 lbs. per 100 lbs. of silk of aluminum chloride, barium chloride, or stannous chloride.

Example 2

Dyeings were made on silk and on rayon using 0.2 lb. per 100 lbs. of Pontacyl Brilliant blue E ("Colour Index" #671) and 2.0 lbs. of a mixture of cetyl and octadecyl sodium sulphates with Glauber's salt. The dyeings were started at 120° F., the temperature was then raised to 180 to 190° F., and the dyeings were run for 45 minutes; the silk was then rinsed and dried. The dyeings were then treated in fresh baths with 5 lbs. per 100 lbs. of silk of aluminum chloride, barium chloride, or stannous chloride. These dyeings showed a wash fastness which was appreciably greater than that of dyeings made without the sulphonated alcohols.

The invention is particularly useful in the preparation of dyestuff compositions from basic dyes. Certain dyes which may be named as illustrative of the class and which form useful dyestuff compositions when treated in accordance with the present invention are: Methyl violet "Colour Index" #680 and Crystal violet "Colour Index" #681, Auramine "Colour Index" #655, Rhodamine B "Colour Index" #749, Rhodamine 6G Extra "Colour Index" #752, Bismark brown "Colour Index" #331, Phosphine G "Colour Index" #793, Basic brown "Colour Index" #752, Victoria blue R "Colour Index" #728, and Victoria green "Colour Index" #652. The triphenyl methane dyes serve as particularly good sources for dyestuff compositions when reacted with the alkyl sulphate ester salts, but the invention is in general applicable to basic dyestuffs other than the triphenyl dyes, e. g., xanthenes, ketonimines, and the other dyestuffs.

The sulphate esters, salts of which are reacted with dyestuffs to produce dyestuff compositions in accordance with the present invention, may be formed by reacting normal straight-chain primary aliphatic alcohols having from 8 to 18 carbon atoms and preferably from 12 to 18 carbon atoms, (obtainable, for example, by catalytic hydrogenation of the corresponding fatty acids, or fatty acid alkyl esters at a temperature of 250° to 400° C. and under high superatmospheric pressure) with a strong normally sulphonating agent such as 100% sulphuric acid, chlorsulphonic acid, or fuming sulphuric acid, at a temperature of 0° to 30° C. The acid ester, which is an alkyl sulphate, may be neutralized with a suitable metal oxide or hydroxide, e. g., sodium, potassium, calcium or other alkali metal or alkaline metal oxides or hydroxides, aluminum oxide, tin oxide, and the oxides of other metals which form soluble salts of the alkyl sulphuric acid ester.

Examples of sulphate esters, the salts of which may be used in the practice of this invention are the alkyl sulphuric acids formed from dodecyl, tetradecyl, cetyl, octadecyl, oleyl and ricinoleyl alcohols.

The dyestuff compositions prepared in accordance with the above description are brilliant and have a much wider utility for certain purposes than dyestuff compositions prepared according to prior art methods with basic dyestuffs. For ordinary purposes the alkali and alkaline earth metal alkyl sulphates will be used.

The dyestuff compositions are of general utility for the treatment of cellulosic fabrics or fibers such as cotton and rayon. When used with rayon (regenerated cellulose fiber) the fiber may be first impregnated with the alkyl sulphuric acid ester salt, and the impregnated fiber can then be passed thru an aqueous solution of the dyestuff, the dyestuff composition forming in situ. In addition, the process as applied to rayon imparts a soft smooth finish to the fiber. The invention is applicable to other forms of artificial silk derived from cellulose, e. g., cellulose nitrate fiber, cuprammonium fiber, etc.

The proportions of dyestuff and alkyl sulphate ester salt which will be used in making the dyestuff compositions may vary within wide ranges. The amount of sulphate ester salt which may be used can vary from 5% to 100% of the chemical equivalent of the dyestuff, and the dyestuff will usually, altho not necessarily be present up to the limit of its solubility.

The above description and examples are given by way of illustration only. Any variation therefrom which conforms to the spirit of the invention is intended to be included within the scope of the claims.

I claim:

1. A compound formed by the reaction of a basic dyestuff and a sulphuric acid ester salt of a normal straight-chain primary aliphatic alcohol having from 8 to 18 carbon atoms.

2. A compound formed by the reaction of a basic dyestuff and a sulphuric acid ester salt of a normal straight-chain primary aliphatic alcohol having from 12 to 18 carbon atoms.

3. A compound formed by the reaction of a basic dyestuff and a water-soluble sulphuric acid ester salt of a normal straight-chain primary aliphatic alcohol having from 8 to 18 carbon atoms, the reaction taking place in aqueous solution.

4. A compound formed by the reaction of a basic dyestuff and an alkali metal salt of a sulphuric acid ester of a normal straight-chain primary aliphatic alcohol having from 12 to 18 carbon atoms.

5. A compound formed by the reaction of a basic dyestuff and a mixture of cetyl and octadecyl sodium sulphates.

SAMUEL LENHER.